No. 648,038. Patented Apr. 24, 1900.
C. LEFFLER.
BOLT LOCK.
(Application filed Aug. 19, 1899.)
(No Model.)
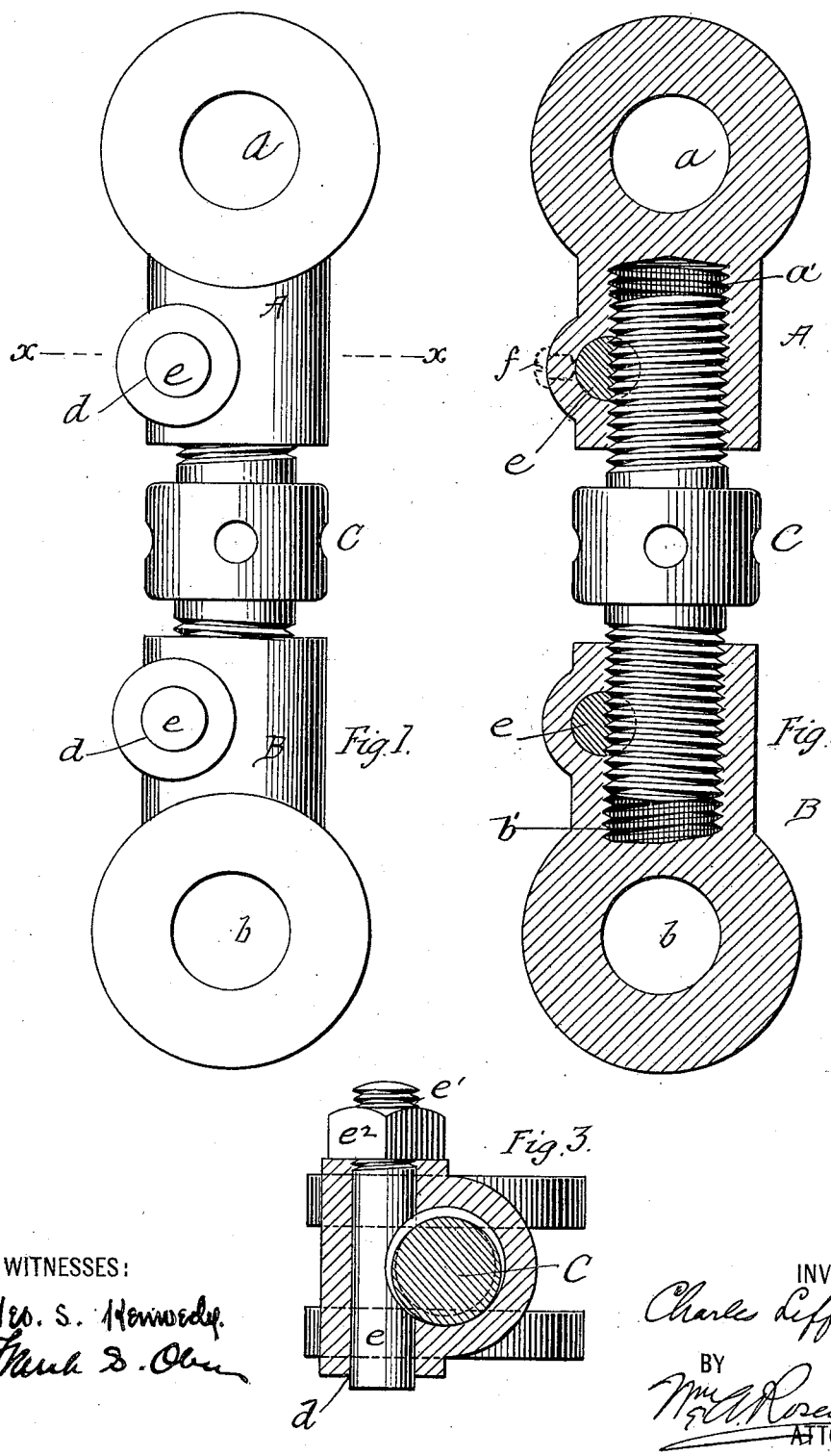

UNITED STATES PATENT OFFICE.

CHARLES LEFFLER, OF NEW YORK, N. Y.

BOLT-LOCK.

SPECIFICATION forming part of Letters Patent No. 648,038, dated April 24, 1900.

Application filed August 19, 1899. Serial No. 727,733. (No model.)

*To all whom it may concern:*

Be it known that I, CHARLES LEFFLER, a citizen of the United States, residing at the city of New York, borough of Brooklyn, in the State of New York, have invented certain new and useful Improvements in Bolt-Locks, of which the following is a full, clear, and exact description.

This invention is a locking device for adjustable links, shaft-couplings, and similar connections containing male and female parts which it is desired to prevent from rotating or moving longitudinally with respect to each other. An example of such coupling is found in the link commonly used to connect the crank-shaft with the die-head in a press. In such links the adjusting device is usually a bolt having right and left hand threads at its opposite ends and a hexagon or other means for turning at the middle. The threads work into sockets at each end of the link, and the link is lengthened and shortened by properly turning the bolt. When once adjusted, it is desirable to lock it to prevent its getting out of adjustment, and this is the object of my invention, and it is accomplished by passing a pin laterally through that part of the link containing the socket in such a location that it will pass through a portion of the socket. That portion of the pin exposed in the socket is cut away to conform to the shape of the socket and a thread is cut on it to correspond with the thread in the socket and form a part thereof. When the threaded adjusting-bolt is inserted into the socket, its threads also work into the threads of the pin. Then by means of a nut on the head of the pin, which works against the side of the link, the pin is drawn laterally and a heavy friction created between the threads of the pin and bolt, which prevents the latter from turning.

The invention will be described in detail with reference to the accompanying drawings, in which—

Figure 1 is a side elevation of a link such as above referred to. Fig. 2 is a longitudinal section of the same, showing the bolt in elevation; and Fig. 3 is a transverse section on line $x \, x$ of Fig. 1.

Referring to the drawings by letter, A B are the two end pieces of an adjustable link. They contain the usual eyes $a \, b$ for connecting purposes and the threaded sockets $a' \, b'$.

C is an adjustable bolt connecting the two end pieces together. This bolt has a right-hand thread at one end, a left-hand thread at the other, and in the middle is provided with sockets for a spanner-wrench or a hexagon for an ordinary wrench, by which the bolt may be turned to draw the ends of the link together or separate them at will.

In one or both of the end pieces a lateral hole $d$ is bored, the axis of which is located approximately tangent to the curved wall of the threaded socket. This hole is made before the socket in the link is drilled. A smooth pin $e$, having a thread $e'$ on one end, is then passed into the hole, in which it makes a good fit. It is then temporarily held by means of a set-screw, (indicated at $f$ in dotted lines,) and the socket is then drilled. The drilling-tool cuts out a segment from the side of pin $e$. Then the socket is tapped and the thread is made continuous across the exposed surface of the pin $e$. After this the link is assembled by screwing the end pieces over the two ends of the bolt C, the threads of the pin being engaged by those of the bolt. The set-screw $f$ is then removed, the link adjusted to its proper length, and pin $e$ drawn laterally by means of a wrench acting on nut $e^2$, which bears against the outside of the end piece. This creates a heavy friction between the threads of the pin and bolt and effectually prevents the latter from turning, and therefore locks the link at the point of adjustment.

The same principle may be applied in shaft-couplings when the abutting ends of the shaft are inclosed by a sleeve. The lateral pin would be cut out to accommodate the shaft and the locking-friction would be created between the smooth surfaces of the pin and shaft. In like manner this locking device may be used in any place where it is desired to prevent relative rotary motion of two connected parts.

Having described my invention, I claim—

1. The combination of a body having a cylindrical opening, a second body cylindrical in form and occupying said opening, a pin extending laterally into or through the first-mentioned body intercepting the opening therein, said pin having a depression corresponding in shape to the surface of said second body, and means for moving the pin in the direction of its length, substantially as described.

2. The combination of a body having a cylindrical threaded opening, a second body cylindrical in form and screwing into said opening, a pin extending laterally into or through the first-mentioned body intercepting the opening therein, said pin having a threaded depression corresponding in shape to the surface of said second body, and means for moving the pin in the direction of its length, substantially as described.

In witness whereof I subscribe my signature in presence of two witnesses.

CHAS. LEFFLER.

Witnesses:
WM. A. ROSENBAUM,
GEO. S. KENNEDY.